US009129094B2

(12) United States Patent
King et al.

(10) Patent No.: US 9,129,094 B2
(45) Date of Patent: *Sep. 8, 2015

(54) SYNDICATION INCLUDING MELODY RECOGNITION AND OPT OUT

(71) Applicant: Google Inc., Mountain View, CA (US)

(72) Inventors: David G. King, San Francisco, CA (US); Kyle Harrison, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/046,576

(22) Filed: Oct. 4, 2013

(65) Prior Publication Data

US 2014/0040980 A1    Feb. 6, 2014

Related U.S. Application Data

(63) Continuation of application No. 12/945,240, filed on Nov. 12, 2010, now Pat. No. 8,584,198.

(51) Int. Cl.
*G06F 21/10*  (2013.01)
*G06Q 10/10*  (2012.01)
(Continued)

(52) U.S. Cl.
CPC .............. *G06F 21/10* (2013.01); *A63H 5/00* (2013.01); *G06Q 10/101* (2013.01); *G06Q 30/06* (2013.01);
(Continued)

(58) Field of Classification Search
CPC .................. G06F 17/30017; G06F 17/30743; G06F 17/30758; G06F 21/10; G10H 2210/066; G10H 2240/141; H04N 21/2541; H04N 21/4627; H04L 2209/60; H04L 2209/603
See application file for complete search history.

(56) References Cited

U.S. PATENT DOCUMENTS 4,506,580 A    3/1985  Koike
4,977,812 A   12/1990  Ino
(Continued)

FOREIGN PATENT DOCUMENTS

CN    1531253 A    9/2004
CN    1628440 A    6/2005
(Continued)

OTHER PUBLICATIONS

Veltkamp, "Content Based Music Retrieval", Utrecht University, Jul. 15, 2002, seven pages.*

(Continued)

*Primary Examiner* — Andrew Nalven
*Assistant Examiner* — Walter Malinowski
(74) *Attorney, Agent, or Firm* — Fenwick & West LLP

(57) ABSTRACT

A syndication system facilitates rights management services between media content owners and media hosting services that elect to participate in the syndication system and mutually elect to participate with each other. The syndication system utilizes a content recognition system to identify hosted media content and ownership rights associated with the hosted content. By applying melody recognition, the content recognition system can identify compositions embodied in hosted media content even when these compositions do not precisely match any known sound recording. Thus, the content recognition system is beneficially able to detect, for example, recorded cover performances and recorded live performances embodied in hosted media content. Once identified, ownership information is determined and the syndication system can facilitate rights management policies associated with the content such as monetizing or blocking the protected content.

19 Claims, 10 Drawing Sheets

(51) Int. Cl.

| | | |
|---|---|---|
| *G11B 27/28* | (2006.01) | |
| *H04N 21/254* | (2011.01) | |
| *H04N 21/233* | (2011.01) | |
| *H04N 21/234* | (2011.01) | |
| *H04N 21/442* | (2011.01) | |
| *A63H 5/00* | (2006.01) | |
| *G06Q 30/06* | (2012.01) | |
| *H04L 29/06* | (2006.01) | |
| *G06Q 50/00* | (2012.01) | |

(52) U.S. Cl.
CPC ............... *G06Q 50/00* (2013.01); *G11B 27/28* (2013.01); *H04L 63/20* (2013.01); *H04N 21/233* (2013.01); *H04N 21/23418* (2013.01); *H04N 21/2541* (2013.01); *H04N 21/44204* (2013.01)

(56) References Cited

U.S. PATENT DOCUMENTS

| | | | |
|---|---|---|---|
| 4,999,773 A | 3/1991 | Clynes | |
| 5,451,709 A | 9/1995 | Minamitaka | |
| 6,928,423 B1 | 8/2005 | Yamanaka | |
| 7,043,473 B1 | 5/2006 | Rassool et al. | |
| 7,853,532 B2 | 12/2010 | Nagao | |
| 8,158,870 B2 | 4/2012 | Lyon et al. | |
| 8,168,876 B2 | 5/2012 | Hsieh | |
| 2002/0042730 A1 | 4/2002 | Homer | |
| 2002/0065779 A1 | 5/2002 | Dutta | |
| 2002/0082731 A1* | 6/2002 | Pitman et al. | 700/94 |
| 2002/0088336 A1* | 7/2002 | Stahl | 84/609 |
| 2002/0099555 A1 | 7/2002 | Pitman et al. | |
| 2003/0037010 A1 | 2/2003 | Schmelzer | |
| 2003/0086341 A1 | 5/2003 | Wells et al. | |
| 2003/0088686 A1 | 5/2003 | Jennings | |
| 2004/0030615 A1 | 2/2004 | Ling | |
| 2004/0143349 A1 | 7/2004 | Roberts et al. | |
| 2005/0001025 A1 | 1/2005 | Ilda et al. | |
| 2005/0015258 A1 | 1/2005 | Somani et al. | |
| 2005/0193016 A1 | 9/2005 | Seet et al. | |
| 2006/0064299 A1 | 3/2006 | Uhle et al. | |
| 2006/0095323 A1* | 5/2006 | Muranami | 705/14 |
| 2006/0107046 A1 | 5/2006 | Raley et al. | |
| 2007/0136444 A1 | 6/2007 | Bentsen et al. | |
| 2007/0169613 A1 | 7/2007 | Kim | |
| 2007/0217648 A1 | 9/2007 | Muehlbauer | |
| 2007/0220592 A1 | 9/2007 | Muehlbauer | |
| 2007/0256547 A1* | 11/2007 | Feeney et al. | 84/615 |
| 2007/0265969 A1 | 11/2007 | Horwat et al. | |
| 2007/0294173 A1 | 12/2007 | Levy et al. | |
| 2008/0209502 A1 | 8/2008 | Seidel | |
| 2008/0228578 A1 | 9/2008 | Mashinsky | |
| 2008/0240490 A1 | 10/2008 | Finkelstein et al. | |
| 2009/0025540 A1 | 1/2009 | Hillborg | |
| 2009/0037558 A1 | 2/2009 | Stone et al. | |
| 2009/0210346 A1 | 8/2009 | Candelore | |
| 2009/0241758 A1 | 10/2009 | Neubacker | |
| 2009/0307409 A1 | 12/2009 | Rogers et al. | |
| 2010/0023328 A1 | 1/2010 | Griffin et al. | |
| 2010/0037304 A1* | 2/2010 | Canning et al. | 726/7 |
| 2010/0114983 A1* | 5/2010 | Robert et al. | 707/803 |
| 2010/0153393 A1 | 6/2010 | Wessling et al. | |
| 2010/0251876 A1 | 10/2010 | Wilder | |
| 2010/0257129 A1* | 10/2010 | Lyon et al. | 706/12 |
| 2011/0106673 A1* | 5/2011 | Shanley et al. | 705/30 |
| 2011/0289598 A1 | 11/2011 | Chastagnol et al. | |
| 2011/0314995 A1 | 12/2011 | Lyon et al. | |
| 2012/0102061 A1 | 4/2012 | Bryson | |
| 2012/0102516 A1 | 4/2012 | Perkins | |
| 2012/0160078 A1* | 6/2012 | Lyon et al. | 84/609 |

FOREIGN PATENT DOCUMENTS

| | | | |
|---|---|---|---|
| CN | 1665184 A | | 9/2005 |
| CN | 1680899 A | | 10/2005 |
| CN | 101493918 A | | 7/2009 |
| CN | 101663708 A | | 3/2010 |
| CN | 102236685 A | | 11/2011 |
| EP | 1455479 A1 | | 9/2004 |
| JP | 01159697 A | | 6/1989 |
| JP | 03276197 A | * | 12/1991 |
| JP | HEI11-15468 A | | 1/1999 |
| JP | 2001-265779 A | | 9/2001 |
| JP | 2002-259609 A | | 9/2002 |
| JP | 2005-107333 A | | 4/2005 |
| JP | 2005-115164 A | | 4/2005 |
| JP | 2009-244567 A | | 10/2009 |
| JP | 2010-509661 A | | 3/2010 |
| KR | 10-2006-0020114 A | | 3/2006 |
| KR | 2009-0000217 A | | 1/2009 |

OTHER PUBLICATIONS

Extended European Search Report for European Patent Application No. EP 11840116.5, Apr. 25, 2014, 5 Pages.

Supplementary European Search Report for European Patent Application No. EP 11839126, Apr. 14, 2014, 7 Pages.

First Office Action for Chinese Patent Application No. CN 201180062280.3, Feb. 8, 2014, 8 Pages.

Chai, W., et al., "Melody Retrieval on the Web", Multimedia Computing and Networking 2002, Proceedings of SPIE, vol. 4673, 2002, pp. 226-241.

Birmingham, W., et al., "Query by Humming with the Vocalsearch System", Communications of the ACM, Aug. 2006, vol. 49, No. 8.

Dias, B., "Automatic Transcription of Musical Whistling", Instituto Superior Tecnico, Universidade Tecnica de Lisboa, Nov. 2008, 95 pages.

Nutzel, J., et al., "Sharing System for Future HiFi Systems", Proceedings of the Fourth International Conference on Web Delivering of Music, Jun. 2004, 8 pages.

"CBMS Networks, Inc.—Advanced DSP for Media Analysis, Indexing, and Search," Website for CBMS Networks, Inc., 2010, 1 page, [online] [retrieved on May 31, 2011] retrieved from the internet <URL:http://cbmsnetworks.com/>.

"BMAT—Barcelona Music & Audio Technologies," Website for BMAT, 2005-2011, 1 page, [online] [retrieved on May 31, 2011] retrieved from the internet <Url:http://www.bmat.com/>.

"About Us—BMAT music innovation," Barcelona Music & Audio Technologies, 2005-2011, 2 pages, [online] [retrieved on Apr. 25, 2011] Retrieved from the internet <URL:http://www.bmat.com/company>.

"SoundHound Instant Music Search and Discovery," SoundHound Inc., 2011, 1 page, [online] [retrieved on Apr. 25, 2011] Retrieved from the internet <Url:http://www.soundhound.com/>.

"Pitch detection algorithm," Wikipedia, last modified on Aug. 3, 2010, 3 pages, [online][retrieved on Dec. 15, 2010] Retrieved from the internet <URL:http://en.wikipedia.org/wiki/Pitch_detection_algorithm>.

Egorov, A., et al., "Cover Song Identification with IF-F0 Pitch Class Profiles," MIREX extended abstract, Sep. 2008, 4 pages.

Ellis, D., et al., "The 2007 Labrosa Cover Song Detection System," Music Information Retrieval Evaluation eXchange (MIREX), Australian Computer Society, 2007, 4 page.

Jensen, J., et al., "A Tempo-Insensitive Distance Measure for Cover Song Identification Based on Chroma Features," Proc. IEEE Int. Conf. Acoust., Speech, Signal Processing, 2008, pp. 2209-2212.

Katsiamia, A.G., et. al., "Practical Gammatone-Like Filters for Auditory Processing," EURASIP Journal on Audio, Speech, and Music Processing, v. 2007, Article ID 63685, 15 pages.

Lyon, R., "A Computational Model of Filtering, Detection, and Compression in the Cochlea", Proceedings IEEE International Conference on Acoustics, Speech, and Signal Processing, Paris, May 1982, pp. 1282-1285.

(56) References Cited

OTHER PUBLICATIONS

Patterson, R., "Auditory Images: How Complex Sounds are Represented in the Auditory System," Acoustical Science and Technology, Jpn , 2000, pp. 183-190,(E) 21, 4.

Serra, J., et al., "Audio Cover Song Identification and Similarity: Background, Approaches, Evaluation, and Beyond," Advances in Music Information Retrieval, SCI 274, 2010, pp. 307-332.

Serra, J., et al., "Chroma Binary Similarity and Local Alignment Applied to Cover Song Identification," IEEE Transaction on Audio, Speech, and Language Processing, Aug. 2008, pp. 1138-1151, vol. 16, Issue 6.

Serra, J., et al., "A Cover Song Identification System Based on Sequences of Tonal Descriptors," MIREX extended abstract, Austrian Computer Society, 2007, 2 pages.

Weintraub, M., "The GRASP Sound Separation System", Proceedings IEEE International Conference on Acoustics, Speech, and Signal Processing, San Diego, Mar. 1984, pp. 18A.6.1-18A.6.4.

PCT International Search Report and Written Opinion for Application No. PCT/US2011/060172 mailed on May 22, 2012, 12 pages.

PCT International Search Report and Written Opinion for Application No. PCT/US2011/060169 mailed on May 4, 2012, 7 pages.

Slaney, M., "A Perceptual Pitch Detector," IEEE, 1990, pp. 357-360.

Slaney, M., et al., "On the importance of Time—A Temporal Representation of Sound," Visual Representations of Speech Signals, 1993, pp. 95-116, John Wiley & Sons Ltd.

Office Action for U.S. Appl. No. 12/945,240, mailed Jan. 14, 2013, 29 pages.

Office Action for U.S. Appl. No. 12/945,240, mailed Jul. 19, 2012, 20 pages.

Chinese First Office Action, Chinese Application No. 201180062778.X, Apr. 21, 2014, 8 pages.

Japanese Office Action, Japanese Application No. P2013-538884, Nov. 4, 2014, 7 pages.

Korean Office Action, Korean Application No. 10-2013-7014783, Jul. 10, 2014 (with concise explanation of relevance), 6 pages.

\* cited by examiner

| Overview | Search | Uploads | Claims | Assets | Reports | | change permissions |
|---|---|---|---|---|---|---|---|

Composition in A Major — Album
(Composition)

<<Back to Search Results

View All Claims

Metadata advanced

CMS Asset ID: IYDfw1ZgGA8
Type: Composition
Provider: Label A
Source: Dropbox Feed-Publishing XML
Custom ID:
Added: Nov 20, 2009, 04:50 PM ISWC:
Title: Composition in A Major — Album
Category:
Writers:

— 302

Related Assets    Edit relationships

This asset is embedded in:
☐ Composition in A Major — Artist A (Sound Recording)

— 308

Ownership Information

Label A provided the following ownership information:
Publisher A owns 66.66% of this asset in United States
Publisher B owns 33.34% of this asset in United States

— 304

Reference Content

— 310

Rights

[Match claim ▼] — 307

Owner policy
Monetize (and track) if Location of the viewer is United States
Applied policy
Monetize (and track) if Location of the viewer is United States

| Overview | Search | Uploads | Claims | Assets | Reports |

Composition in A Major – Artist A     <<Back to Search Results
(Sound Recording)

View All Claims

Metadata    402

Viewing: advanced

| | |
|---|---|
| CMS AssetID: | _yQcGydqDXU |
| Type: | Sound Recording |
| Provider: | Label A |
| Source: | CMS User |
| Custom ID: | |
| Added: | Nov 02, 2009, 11:23 AM |

| | |
|---|---|
| Artist: | Artist A |
| Song: | Composition in A Major |
| Album: | |
| Genre: | Rock |
| Label: | ABC123 Records |
| Audio ISRC: | USUM70999352 |
| UPC: | 00602527259987 |
| GRid: | |

Ownership Information    404

View by: owner ▽

Label A owns this asset in Worldwide

Related Assets    408    Edit relationships

This asset embeds:
☐ Composition in A Major – Album (Composition)

Reference Content    410

| | |
|---|---|
| Reference ID: | 61wApziT5aw |
| Date: | Mar 08, 2010, 12:05 PM |
| Type: | Audio |
| Provider: | Label A |
| Status: | Active |

| | |
|---|---|
| Reference ID: | Fw7BzeSOu8 |
| Date: | Mar 31, 2010, 02:46 PM |
| Type: | Audio |
| Provider: | Label A |
| Status: | Active | change permissions

| Overview | Search | Uploads | Claims | Assets | Reports | change permissions |

Managed ContentID Syndication Policies

<u>910</u>　　<u>920</u>

CID Syndication
Partner　　Url　　　　　　　Please select your usage policy across all assets
Partner 1　www.url-1.com　☑ Opt-in to Syndication　○ Global Default　○ Global Block　○ Unspecified
Partner 2　www.url-2.com　☐ Opt-in to Syndication　  Global Default　  Global Block　  Unspecified
Partner 3　www.url-3.com　☑ Opt-in to Syndication　○ Global Default　○ Global Block　○ Unspecified
Partner 4　www.url-4.com　☑ Opt-in to Syndication　○ Global Default　○ Global Block　○ Unspecified

[Submit]

<u>930</u>　　　　　　　　　　　　　　　　　　　　　　　　　<u>940</u>

Opt-in to Syndication　Match uploads of syndication partners against my references
Global Default　　　　Deliver the usage policies defined for the YouTube website for all matches
Global Block　　　　　Deliver a usage policy of Block for all matches
Unspecified　　　　　Deliver a usage policy of Unspecified. This policy is determined between the Rights Holder and the Publishing site.

SYNDICATION INCLUDING MELODY RECOGNITION AND OPT OUT

RELATED APPLICATIONS

This application is a continuation of U.S. patent application Ser. No. 12/945,240 entitled "Syndication Including Melody Recognition and Opt Out," to David G. King and Kyle Harrison, filed on Nov. 12, 2010, the contents of which are incorporated by reference herein.

BACKGROUND

1. Field of Art

The invention generally relates to media sharing and more specifically to enforcing ownership rights to media content.

2. Description of the Related Art

Generally, a "sound recording" refers to a particular musical performance stored on a tangible storage medium such as an optical disc (e.g., CD, DVD), magnetic disc or tape, solid state memory (e.g., memory card) or other persistent, tangible storage medium. In the music industry, sound recordings are typically produced and distributed by record labels, i.e., by companies that scout, develop, and manage recording artists, and coordinate the marketing, promotion, production, manufacture, and distribution of sound recordings. These record labels typically hold various rights under copyright law to the sound recordings they produce, although other entities may also hold these rights. In some instances, two or more recording labels or other entities may hold ownership rights to a single sound recording as the sound recording ownership may vary by country.

In contrast to a sound recording, a "composition" generally refers to an original piece of music (i.e., a song) that is not limited to one particular sound recording that memorializes a performance of the piece. For example, for a given composition by a song writer, there may be a studio recording by the song writer, a recorded live performance, and a recorded cover performance by another artist, each of which would be a distinct sound recording. Ownership rights to a composition are typically held by music publishers who collect royalties and distribute them to the songwriters, although other entities may also hold these rights. (In some cases, the music publisher is also the recording label).

Most recording labels directly collect royalties on the use of their sound recordings. By contrast, composers and music publishers typically collect royalties on the use of their compositions through the facilities of a copyright collecting agency (or a "performance rights organization"), such ASCAP, BMI, SESAC. For international performances, international collecting societies are typically responsible for collecting royalty payments on behalf of the rights holders. In some instances, two or more publishers or other entities hold ownership rights to a single composition. Furthermore, composition ownership may vary by country.

Media hosting services that allow users to upload multimedia content (e.g., music content and video content) for mass viewing have become increasingly popular in recent years. As the volume of hosted media content continues to grow, the management of ownership rights pertaining to the hosted media content has become an increasingly challenging problem for hosting services. For music content embedded in an audio or video file, for example, the songwriter, the publisher, and the recording label are just some of the different entities that may hold rights to the media content. For appropriate payments to be made to copyright holders, media content must be correctly identified. However, unlike television and radio environments where the content is typically identified prior to airing, media hosting services often handle user-provided media content that may initially be unidentified. Manual identification of such media content becomes onerous when media hosting sites receive thousands or millions of new media uploads every day, and traditional automated mechanisms lack the robustness and scalability required for modern media hosting services. The identification problem becomes even more complex when media uploads include live performances or cover performances that do not precisely match any sound recording known to the media hosting service, and their content is not identified in associated, uploaded, metadata. Thus, a method for identifying new sound recordings of known compositions is needed to facilitate accurate payment of royalties to copyright holders.

SUMMARY

A syndication system facilitates rights management services between mutually participating media content owners and media hosting services. The syndication system utilizes a content recognition system that determines ownership rights associated with media files uploaded to a media hosting service. In addition to identifying previously known sound recordings, the content recognition system also beneficially identifies compositions (e.g. songs) that are embodied in recorded live performances or cover performances that do not precisely match previously known sound recordings. Once the content recognition system identifies compositions and/or sound recordings, the content recognition system can determine ownership information pertaining to those compositions and/or sound recordings.

To identify ownership information pertaining to a composition, a fingerprinting module generates a melody fingerprint for an audio clip. The melody fingerprint represents a melody of the composition embodied in the audio clip by extracting features that are invariant to changes in the key, instrumentation, artistic interpretation or performance, or recording methods or artifacts. Thus, differences in the musical performance, recording, and processing do not substantially affect the melody fingerprint.

The content recognition system then queries a reference database for a reference melody fingerprint matching the input melody fingerprint. The reference database stores reference melody fingerprints of compositions embodied in a set of reference sound recordings. Each reference melody fingerprint in the reference database is associated with composition ownership information indicating at least one entity having ownership rights to the composition embodied in the reference sound recording from which the reference melody fingerprint was made. Responsive to finding a reference melody fingerprint that matches the input melody fingerprint in the reference database, the syndication system determines a rights management policy associated with the reference composition corresponding to the matching melody fingerprint. The syndication system then provides instructions to the media hosting service for carrying out the rights management policy associated with the reference composition.

To identify ownership pertaining to a sound recording, the content recognition system generates an audio fingerprint for the audio clip. Unlike the melody fingerprints discussed above, the audio fingerprints are generally unique to a specific recording, and typically vary with differences in performance, recording, and processing, and thus can be used to distinguish between different recordings of the same composition. The content recognition system then queries the reference database for a reference audio fingerprint that matches the audio fingerprint. Responsive to finding a matching reference audio fingerprint for the audio fingerprint in the reference database, the syndication system determines a rights management policy associated with the reference sound recording corresponding to the matching audio fingerprint. The syndication system then provides instructions to the media hosting service for carrying out the rights management policy associated with the reference sound recording.

The rights management policies may vary depending on the needs of the content owners. For example, the rights management policy may indicate that the media hosting service should block access to the media file containing the audio clip. Alternatively, the rights management policy may indicate that the media hosting service should monetize the media file containing the audio clip. Under this option, the syndication service provides advertisements for placement together with the monetized media file, and facilitates revenue sharing between the media hosting service and the content owners. In other instances, the rights management policy may indicate that the hosting service should statistically track usage of the media file containing the audio clip.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE FIGURES

FIG. 3 is an embodiment of a graphical interface displaying various metadata associated with a known composition.

FIG. 4 is an embodiment of a graphical interface displaying various metadata associated with a known sound recording.

FIG. 7 is an embodiment of a graphical interface displaying various metadata associated with a claim generated on behalf of a content owner.

FIG. 9 is an embodiment of a graphical interface for selecting preferences for participation in a syndication system.

Figure 1A:
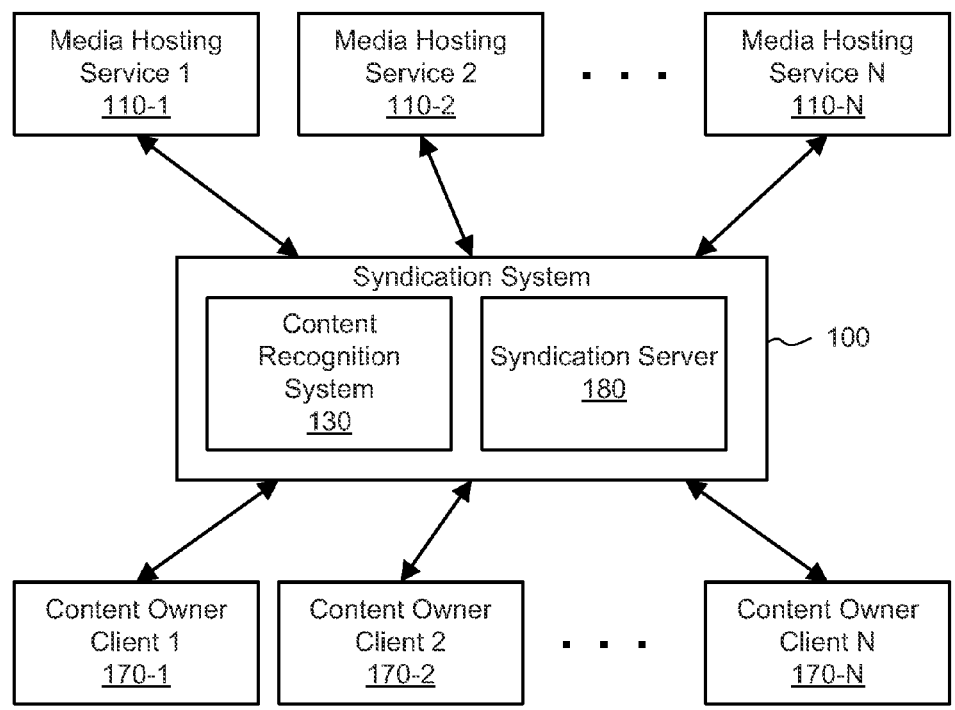
FIG. 1A illustrates an embodiment of a syndication system.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A syndication system facilitates rights management between mutually participating media hosting services and content owners. Individual media hosting services and content owners can choose whether or not to participate in the syndication system. For those entities electing to participate in the syndication system and with each other, the syndication system identifies content hosted by the participating media hosting services using a content recognition system. Once media content is identified, the syndication system determines rights management policies associated with the identified content. Then the syndication facilitates rights management services between the media hosting services and the content owners of the identified content in accordance with the identified policy. Under various rights management policies, the rights management services may include, for example, instructing the media hosting service to block the content, selecting advertisements for placement with the hosted content and managing revenue sharing between the media hosting service and the content owners, and/or tracking usage of the hosted content and providing tracked statistics to the content owners.

The syndication system utilizes a content recognition system that automatically identifies sound recordings and compositions embedded in user-provided content (e.g., video and/or audio files) uploaded to a media hosting service. As used herein, a "sound recording" and a "composition" are each works that would be recognized as such under copyright law. By automatically identifying both sound recordings and compositions, the content recognition system is capable of detecting the use of both master recordings of a composition (e.g., a studio recording) released by a record label, and any other recordings of a composition, such as cover performances, newly released versions, alternative versions (e.g., acoustic versions) or live performance footage. Once media content is identified, the syndication system can assist the media hosting service in managing and monetizing ownership rights on behalf of the content owners. Thus, for example, the syndication system can instruct the media hosting service to block media content on behalf of the owners, or the syndication system can assist the media hosting service in monetizing the media content by providing targeted advertisements for placement together with the media content and distributing royalties to the content owners.

Automated detection of media content is beneficial, if not necessary, for large scale media rights hosting and management solutions because manual review of all uploaded media content is at best impractical. Furthermore, it is difficult or impossible for humans to remember the ownership rights associated with all possible compositions or sound recordings that may be uploaded to a media hosting service. By automating the detection of sound recordings and compositions in an efficient and scalable manner, the syndication system can minimize the amount of manual intervention required by rights holders. This automated detection is particularly beneficial for high traffic media hosting services which may receive thousands or millions of new user-provided media uploads every day. This results in increased efficiency in the overall usage of copyrighted works and the payment of royalties for the same, thereby benefiting the copyright holders of such recordings and compositions.

System Architecture

FIG. 1A illustrates one embodiment of a syndication system 100. The syndication system comprises a content recognition system 130 and a syndication server 180. The syndication system 100 is coupled (e.g., over a network) to a plurality of content owner clients 170 (e.g., content owner client 170-1, 170-2, ..., 170-N) and a plurality of media hosting services 110 (e.g., media hosting services 110-1, 110-2, ..., 110-N). Each content owner can elect (e.g., via an interface on the content owner client 170 provided by the syndication system 100) whether or not to generally participate in the syndication system 100, and if so, which specific media hosting services 110 to participate with. Similarly, each media hosting service 110 can elect, using the syndication system 100, whether or not to generally participate in the syndication system 100, and if so, which specific content owners to participate with. For a participating media hosting service 110, the content recognition system 130 identifies media content hosted by the media hosting service 110 and finds participating content owners having ownership rights associated with that media content. The syndication server 180 then interfaces with the participating media hosting service 110 and the participating content owners (via clients 170) to facilitate rights management services between them.

Figure 1B:
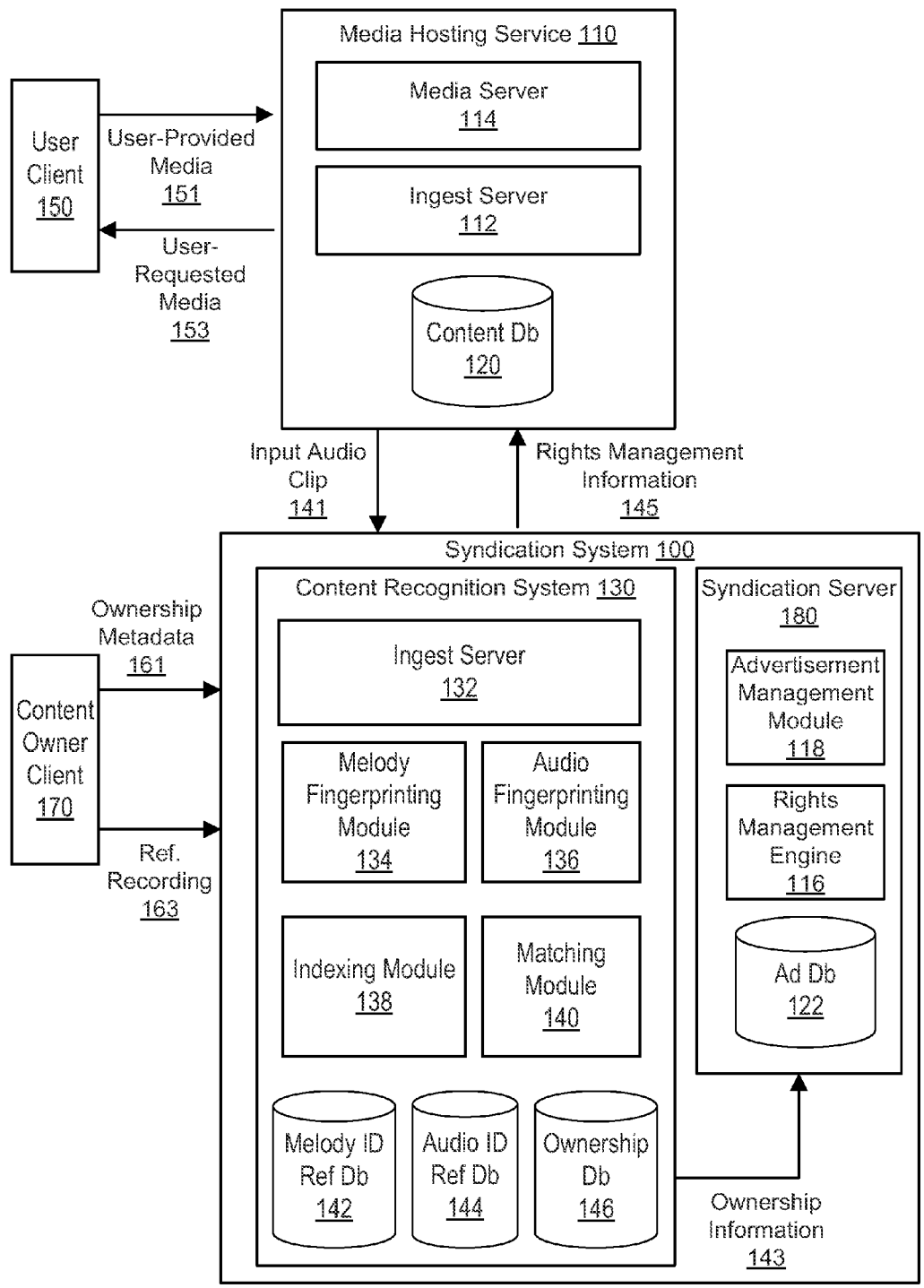
FIG. 1B illustrates an embodiment of a syndication system operating in conjunction with a participating media hosting service and a participating content owner.

FIG. 1B illustrates an embodiment of the syndication system operating in conjunction with a participating media hosting service 110 and a content owner client 170. The clients communicate with the service 110 and the syndication system 100 over a network (not shown). Conventional elements are not necessarily shown in order to avoid obscuring the relevant aspects of this embodiment.

The media hosting service 110 is configured to enable users to upload, share, and view media content such as video and audio files. In one embodiment, users interact with the media hosting service 110 via a media hosting web site accessible by a web browser executing on a user client 150. Using the user client 150, users can upload user-provided media 151 to the media hosting service 110 and/or view user-requested media 153 hosted by the media hosting service 110 (e.g., via an online interface facilitated over a network). The media hosting service 110 utilizes the syndication system 100 to identify and facilitate rights management policies pertaining to the media content hosted by the media hosting service 110. As illustrated, the syndication system 100 receives an audio clip 141 from the media hosting service 110 and returns the corresponding rights management information 145.

In one embodiment, the media hosting service 110 comprises an ingest server 112, a media server 114, and a content database 120. In alternative configurations, the media hosting service 110 may comprise different or additional modules.

The ingest server 112 receives the user-provided media 151 (e.g., an audio or video file) from the user client 150. The ingest server 112 optionally performs audio and/or video processing on the user-provided media 151, for example, to encode the user-provided media 151 in a standardized format. Once uploaded, the user-provided media content 151 is stored in the content database 120. Using the user client 150, a user can request to view hosted media content previously stored in the content database 120. Upon request, the media server 114 streams the user-requested media 153 from the content database 120 to the user client 150 for viewing by a user.

The media hosting service 110 utilizes the content recognition system 130 of the syndication system 100 to identify ownership rights pertaining to the media content hosted by the media hosting service 110. As illustrated, the content recognition system 130 receives an audio clip 141 from the media hosting service 110 and returns the corresponding ownership information 143 utilized by the syndication server 180. The content recognition system 130 also enables content owners (e.g., record labels and/or publishers) to provide ownership metadata 161 and reference recordings 163 via a content owner client 170. The reference recordings 163 and ownership metadata 161 correspond to media content (e.g., sound recordings or compositions) for which the content owners seek enforcement of their ownership rights. The content recognition system 130 seeks to match the audio clips 141 to one or more reference sound recordings 163 and returns the corresponding ownership information 143 when a match is found.

In one embodiment, the content recognition system 130 comprises an ingest server 132, a melody fingerprinting module 134, an audio fingerprinting module 136, an indexing module 138, a matching module 140, a melody ID reference database 142, an audio ID reference database 144, and an ownership database 146. In alternative configurations, the content recognition system may comprise different or additional modules.

The ingest server 132 receives the reference recordings 163 and ownership metadata 161 from the content owner client 170. The reference recordings are sound recordings for which a record label or other entity has ownership rights. Typically a publisher or other entity will also have ownership rights to a composition embodied in the sound recording. The reference recordings 163 may comprise an audio file encoded in any type of audio codec (e.g., AAC, HE-AAC, MP3, FLAC, ALAC, OGG, WMA, and so forth), and may be an entire audio file (e.g., a recording of a complete musical performance) or a portion of an audio file. The ingest server 132 optionally performs audio processing on the reference recording 163, for example, to encode the reference recording 163 in a standardized format. The ownership metadata 161 typically comprises a text-based file that stores identifying information related to the reference recording 163 and the content owners. The ownership metadata 161 may be organized into various categories or fields such as, for example, artist, title, genre, label, publisher, etc.

The ingest server 132 is also configured to receive audio clips 141 from the media hosting service 110. Like the reference recordings 163, the audio clips 141 may comprise audio files encoded in any type of audio codec, and may be entire audio files or portions of audio files. Alternatively, the audio clips 141 may comprise the audio portions of video files (or portions of video files). In other embodiments, the audio clip 141 may be a compressed representation (e.g., a fingerprint) of an audio clip rather than an actual audio file. The ingest server 132 optionally performs audio processing on the audio clips 141, for example, to encode the audio clips 141 in a standardized format or to extract the audio portions of video files.

The audio fingerprinting module 136 generates reference audio fingerprints (also referred to as "audio ID files") for the reference sound recordings 163 provided by content owners. The audio fingerprinting module 136 is configured to generate audio fingerprints that uniquely represent a particular sound recording owned by a record label or other entity. An audio fingerprint compactly represents the audio characteristics of a reference sound recording 163 in a format that can be efficiently compared and matched to other audio fingerprints. The audio fingerprinting module 136 similarly generates audio fingerprints for audio clips 141 received from the media hosting service 110 so that the audio fingerprints can be compared to the reference audio fingerprints.

The melody fingerprinting module 134 generates reference melody fingerprints (also referred to as "melody ID files") for reference sound recordings provided by content owners. The melody fingerprints are designed to uniquely represent a composition (which may be embodied in various studio recordings, live performance recordings, or cover performances) based on the melody of the composition. A melody fingerprint compactly represents the melodic characteristics of a reference sound recording in a format that can be efficiently compared and matched to other melody fingerprints. In contrast to an audio fingerprint, which uniquely represents a particular recording of a performance, a melody fingerprint instead represents the melody of a composition that is embodied in the performance, and does so in such a way that variations in key, instrumentation, encoding formats, and other performing, recording, and processing variations do not substantially affect the features of the melody fingerprint. Thus, a melody fingerprint for a live performance of a particular composition will match a melody fingerprint for a studio recording of that composition, while the audio fingerprints for the live and studio performances will not match. The melody fingerprinting module 134 similarly generates melody fingerprints for audio clips 141 received from the media hosting service 110.

In one embodiment, the melody fingerprinting module 134 detects and compactly represents a sequence of pitch intervals occurring between different time points in the audio clip 141. Melody fingerprinting using a pitch interval representation is further described in U.S. patent application Ser. No. 12/826,623 entitled "Intervalgram Representation of Audio for Melody Recognition" to Richard Lyon, et al., the contents of which are incorporated by reference herein. In one such embodiment, the audio clip 141 is first processed to generate a Stabilized Auditory Image (SAI). The SAI represents the audio clip 141 using an auditory model designed to simulate how the human auditory system processes and represents sound. Using the SAI, representative features of the audio clip 141 can be extracted that are characteristic of the audio features perceived by the human ear. For example, the perceived dominant musical tones in the input audio clip 141 can be extracted at regular time intervals throughout the input audio clip 141. These extracted tones are largely independent of the particular instrumentation, recording parameters, encoding, or processing used to produce the input audio clip. Each extracted tone can correspond to, for example, one of the twelve notes in the musical scale. Alternatively, a finer scale may be used (e.g., 36 possible tones per octave instead of 12). Thus, the input audio clip 141 is reduced to a representation comprising a sequence of the perceivable tones occurring in the audio clip 141. In order to convert the representation to one invariant to key, the sequence of extracted tones is further processed to determine pitch intervals (e.g., number of whole and or half-steps) between temporally consecutive tones. This sequence of pitch intervals forms a melody fingerprint that is invariant to the musical key. Furthermore, the melody fingerprint is substantially invariant to instrumentation, tempo changes, and other performing, recording, and processing differences. The melody fingerprint representation allows the content recognition system to find reference recordings of compositions that are similar enough that present copyright law may recognize them as embodying the same compositions. Thus, for example, melody fingerprints can be used to accurately match live performances and/or cover performances of a composition to a different reference recording of the composition.

The indexing module 108 indexes reference audio fingerprints and reference melody fingerprints stored in the audio ID database 144 and the melody ID database 142 respectively. A variety of different indexing schemes can be used, but generally, the indexing scheme is designed to improve the efficiency of comparing and matching an input fingerprint for an audio clip 141 against the reference fingerprints in the reference databases 142, 144. In one embodiment, the indexing module 138 applies a locality sensitive hashing (LSH) bands indexing scheme. In LSH bands indexing, reference fingerprints in the reference data bases 142, 144 are indexed by a set of unique fixed-length byte sequences (i.e., "index keys"), which in one embodiment, are 4 bytes wide. For each index key (i.e., a unique 4-byte sequence), the LSH index stores pointers to all reference fingerprints in the reference databases 142, 144 that contain that particular byte sequence. Thus, for example, if reference fingerprints A, D, and X each include the 4-byte sequence {A5 B1 43 67}, the LSH index stores pointers to the location of reference fingerprints A, D, and X in the reference databases 142, 144 in association with the index key {A5 B1 43 67}. The LSH index can be queried with an index key that is obtained from a fingerprint of an input recording, and can return pointers to the fingerprints of each reference audio clip that is stored in the reference databases 142, 144 that contains that particular index key. LSH bands indexing is just one example of an indexing scheme for indexing the reference fingerprints in the reference databases 142, 144. In alternative embodiments, the indexing module 138 can index reference fingerprints according to a different indexing scheme.

The matching module 140 compares audio and melody fingerprints (ID files) representing the audio clip 141 against reference audio and melody fingerprints in the reference databases 142, 144 to determine a reference sound recording and/or reference composition that best matches the audio clip 141. Based on the outcomes of the matches, different actions will be taken.

First, an audio ID match indicates that the audio clip 141 matches one of the reference sound recordings. An audio ID match also indicates that a composition embodied in the audio clip 141 matches a composition embodied in the reference sound recording. Thus, for an audio ID match, the matching module 140 typically identifies both sound recording and composition ownership.

Second, a melody ID match, in the absence of an audio ID match, indicates that a composition embodied in the audio clip 141 matches a composition embodied in at least one of the reference sound recordings, even though there is no sound recording match. An melody ID match may occur, for example, when the audio clip 141 embodies a cover performance or live performance of a composition, while the reference database includes a different recording (e.g., a studio recording) of the composition. Thus, for a melody ID match, in the absence of an audio ID match, the matching module typically identifies only the composition ownership, and does not identify any sound recording ownership.

The matching module 140 outputs ownership information 143 indicating the identified entities having ownership rights to the audio clip 141, based on the foregoing outcomes. This process is further described below with respect to FIG. 5.

As discussed above, the matching module 140 determines matches between an input fingerprint for an audio clip 141 and one or more reference fingerprints in the reference databases 142, 144. To improve the efficiency of finding matches, the matching module 140 typically operates in conjunction with the indexing module 138 to first locate candidate reference fingerprints that are most likely to match the fingerprint for the audio clip 141. For example, in one embodiment that utilizes LSH bands indexing, the indexing module 138 divides the input fingerprint for audio clip 141 into a plurality of bands (e.g., 4 byte wide bands) that serve as a set of index keys. The indexing module 138 uses these index keys to query an LSH bands index that returns a set of pointers to candidate reference fingerprints in reference databases 142, 144 that contain at least one of the index keys. Once a set of candidate reference fingerprints is identified, the matching module 140 calculates a match metric between the input fingerprint and each one of the candidate reference fingerprints. The match metric provides a figure of merit as to the quality of the match (e.g., a score, distance, probability, or other measure). For example, in one embodiment, the match metric is a Euclidian distance or a Mahalanobis distance between a fingerprint for the audio clip 141 and one or more candidate reference fingerprints in the reference databases 142, 144. A candidate reference fingerprint is considered to match the fingerprint for the input audio clip 141 when the calculated Euclidian or Mahalanobis distance between the candidate reference fingerprint and the fingerprint for the audio clip 141 is less than a threshold.

In alternative embodiments, the indexing module 138 or matching module 140 can receive a fingerprint representation of the audio clip 141 from a fingerprint source that is external to the content recognition system 130 rather than from one of the fingerprinting modules 134, 136. In these embodiments, the fingerprinting modules 134, 136 are omitted, and the ingest server 132 is configured to receive fingerprints representative of the audio clip 141 rather than the audio clip 141 itself. For example, in one embodiment, the syndication system 100 provides an instance of the fingerprinting modules 134, 136 to participating media hosting services. In this embodiment, the fingerprinting is performed by the individual media hosting services 110 and the fingerprints are then provided to the syndication system 100 for processing. In another embodiment, a fingerprinting module different than the melody fingerprinting module 134 and the fingerprinting module 136 is providing to participating media hosting services. This fingerprinting module allows the media hosting services 110 to generate some intermediate compact representation of the hosted media files to provide to the syndication system 100. The content recognition system 130 may then derive the melody and audio fingerprints from this intermediate representation.

The melody ID reference database 142 stores reference melody fingerprints for a plurality of reference recordings, each representative of a particular composition. Similarly, the audio ID reference database 144 stores reference audio fingerprints for a plurality of reference recordings, each representative of a particular sound recording.

The ownership database 146 stores ownership metadata identifying the ownership rights associated with the reference sound recording and/or compositions embodied in the reference recordings 163. Examples of ownership metadata stored in the ownership database 146 will be described in further detail below with reference to FIG. 3-4. The ownership metadata also includes ownership policies indicating how, if at all, the content owner wants to enforce the rights associated with the sound recording and/or composition (e.g., block, track, or monetize). A process for handling different ownership policies will be described in further detail below with reference to FIG. 6.

In another embodiment, audio and/or melody fingerprints generated for audio clips 141 can be stored as additional reference fingerprints in the melody ID reference database 142 and the audio ID reference database 144. In this way, content owners can supplement the reference databases 142, 144 by providing additional recordings of a particular composition or additional instances of a particular sound recording.

The syndication server 180 receives ownership information 143 from the content recognition system 130 and provides rights management information 145 to the media hosting service 110 to carry out rights management policies. In one embodiment the syndication server 180 includes an advertisement database 122, an advertisement management engine 118, and a rights management engine 116. In alternative configurations, the media hosting service 110 may comprise different or additional modules.

The rights management engine 116 manages and enforces ownership policies associated with media content, and provides rights management information 145 to the media hosting service 110. For example, in one embodiment, content owners can set an ownership policy associated with a media item to "track," "monetize," or "block." If the content owner chooses to block content, the rights management information 145 includes instructions for the media hosting service 110 to remove the content from the content database 120 or otherwise prevent the user client 150 from accessing the content. If a content owner chooses to monetize the content, the rights management information 145 includes advertisements to be presented together with the user-requested media 153. The rights management engine 116 furthermore allocates royalties generated from the advertisements between the media hosting service 110 and the content owners, typically based on a licensing agreement between the media hosting service 110 and the content owner. If a content owner chooses to track content, the rights management information 145 includes an instruction for the media hosting service 110 to provide statistics to the syndication server 180 related to the content (e.g., number of views). The rights management engine 116 may then provide the tracked statistics to the content owners.

The advertisement database 122 stores advertising content to be presented along with the user-requested media 153 when the content owners choose to monetize content. The advertising content may be in the form of images, videos, audio, text, hyperlinks, or a combination of formats. The advertisement management module 118 manages access to advertising content stored in the advertisement database 122 and determines advertising content to associate with certain user-requested media 153. In one embodiment, the advertisement management module 118 selects advertisements based on the identity of the sound recording and/or composition in the user-requested content 153 and/or the ownership information associated with the content. For example, the advertisement management module 118 may select an advertisement with a hyperlink to a web site belonging to a record label that has ownership rights to a sound recording embodied in the user-requested media 153. In other embodiments, the advertising content is selected based on other factors as well, such as user-specific information and preferences.

In alternative embodiments, one or more of the functions performed by the advertisement management module 118, advertisement database 122, and rights management engine 116 may instead be performed by individual media hosting services 110 instead of by the syndication server 180. Thus, for example, in one embodiment, the syndication server 100 is responsible only for ownership identification, and the media hosting service 110 is responsible determining how to manage rights with the content owners. In another example embodiment, the syndication server 100 is responsible for identifying rights management policies and allocating royalties, but the individual media hosting service 110 is responsible for selecting and placing advertisements.

Each of the various components (alternatively, modules) of the media hosting service 110 and the syndication system 100, e.g., ingest server 112, media server 114, rights management engine 116, advertisement management system 118, ingest server 132, melody fingerprinting module 134, audio fingerprinting module 136, indexing module 138, and matching module 140 are implemented as part of a server-class computer system with one or more computers comprising a CPU, memory, network interface, peripheral interfaces, and other well known components. The computers themselves preferably run an operating system (e.g., LINUX), have generally high performance CPUs, 1 G or more of memory, and 100 G or more of disk storage. Of course, other types of computers can be used, including personal and handheld computers when the database is not too big for them, and it is expected that as more powerful computers are developed in the future, they can be configured in accordance with the teachings here. Generally, the modules comprise computer-executable program instructions stored on a computer readable storage medium (e.g., a hard disk). In operation, the computer-executable program instructions are loaded into a memory and executed by one or more processors included as part of the system. When configured to execute the various operations described herein, a general purpose computer becomes a particular computer, as understood by those of skill in the art, as the particular functions and data being stored by such a computer configure it in a manner different from its native capabilities as may be provided by its underlying operating system and hardware logic. An example of a media hosting service 110 is, for example, the YOUTUBE™ website; other media hosting systems are known as well, and can be adapted to operate according to the teachings disclosed herein. It will be understood that the named components of the media hosting service 110 and syndication system 100 described herein represent one embodiment of the present invention, and other embodiments may include other or differently named components. In addition, other embodiments may lack components described herein and/or distribute the described functionality among the modules in a different manner. Additionally, the functionalities attributed to more than one component can be incorporated into a single component.

Although only a single media hosting service 110 is illustrated in FIG. 1B for clarity of description, the syndication system 100 may be adapted for use by any number of different media hosting services 110 as illustrated in FIG. 1A. In other alternative embodiments, the content recognition system 130 may be incorporated as a component of the media hosting service 110. Furthermore, the media hosting service 110 may interact with many different user clients 150. Similarly, the content recognition system 130 may interact with any number of content owner clients 170. Furthermore, a single client could be used as both a user client 150 and a content owner client 170.

In one embodiment, the media hosting service 110 provides the audio clips 141 to the content recognition system 130 as part of the upload flow of the media hosting service 110. Thus, in this embodiment, user-provided media content 151 is identified prior to, concurrently with, or shortly after being stored to the content database 120 and made accessible for download or viewing by other users, if permitted per the ownership metadata found in the ownership rights database 146. In another embodiment, the content recognition system 130 is configured to perform legacy scanning of previously stored content in the content database 120. This embodiment allows, for example, the content recognition system 130 to identify ownership rights pertaining to hosted content that existed prior to the first use of the content recognition system 130 (e.g., before media hosting service 110 began participating with the syndication system 100). Additionally, legacy scanning is useful for updating ownership information and usage policies associated with a content database 120 as new reference sound recordings 163 and the ever changing ownership metadata 161 become available to the content recognition system 130.

Operation and Use

Figure 2:
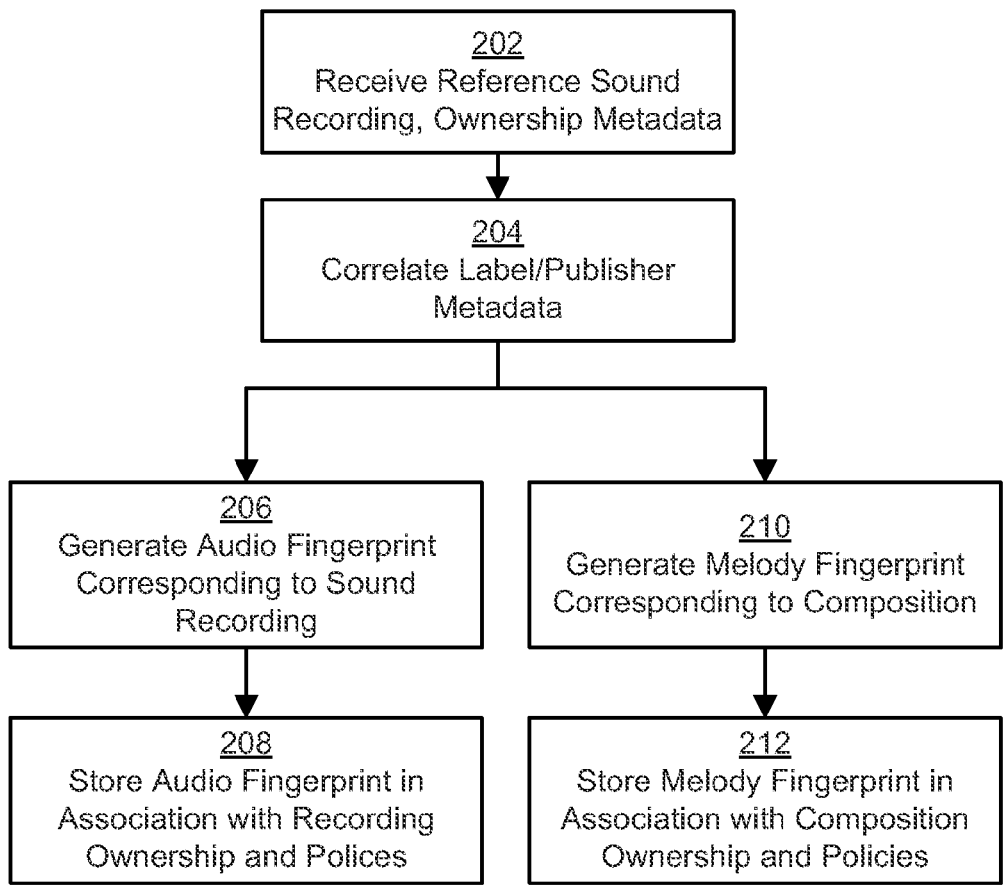
FIG. 2 is a flowchart illustrating an embodiment of a process for generating an audio fingerprint reference database and a melody fingerprint reference database.

FIG. 2 illustrates an embodiment of a process performed by the content recognition system 130 for generating the reference databases 142, 144, 146. The content recognition system 130 receives 202 a reference sound recording 163 and/or the ownership metadata 161 corresponding to that sound recording (including desired ownership policies) from a content owner via the content owner client 170. In some instances, only a portion of the reference sound recording 163 and/or ownership metadata 161 is provided by a single content owner. For example, a publisher may provide only ownership metadata associated with a composition without providing a reference sound recording. In other instances, a record label may provide ownership information related to a sound recording without identifying the publisher(s) having ownership rights to the underlying composition. In yet other instances, a content owner may indicate that it has only partial ownership to a composition (e.g., 50% ownership) without necessarily identifying the other entities having the remaining ownership rights. To assemble piecemeal information, the content recognition system 130 correlates 204 the received information and combines the information into a set of entries, each corresponding to a single sound recording or composition. Furthermore, composition entries may be linked to one or more sound recording entries that embody the composition. The correlation is typically performed by matching various metadata fields (e.g., song title, artist name, identification numbers, etc.) that are common to the partial information submissions.

The audio fingerprinting module 136 generates 206 a reference audio fingerprint for the reference sound recording and stores 208 the reference audio fingerprint in association with the sound recording ownership metadata. The melody fingerprinting module 134 generates 210 a reference melody fingerprint representing the composition embodied in the reference sound recording and stores 212 the reference melody fingerprint in association with corresponding composition ownership metadata. Thus, the content recognition system 130 produces both a reference audio fingerprint and a reference melody fingerprint for each reference recording provided.

FIG. 3 is a graphical interface illustrating an example of an ownership metadata entry associated with a composition. Such a graphical interface may be available, for example, to an administrator of the content recognition system 130, the media hosting service 110, and or a content owner. Alternatively, some or all of the metadata shown in FIG. 3 may be used only internally, and may therefore not be available for display in a graphical interface.

The ownership metadata is divided into a number of categories, each comprising different identifying fields. For example, in this embodiment, the ownership metadata is categorized into metadata 302, ownership information 304, rights 306, related assets 308, and reference content 310 categories. The metadata category 302 provides various fields identifying the composition including, for example, an identifier field (e.g., CMS asset ID), Type (e.g., composition or sound recording), Provider (i.e., the entity that submitted the reference data), Source, Custom ID, Added (i.e., date/time of submission), ISWC, Title, Category, and Writers. As illustrated, some of the fields may be empty indicating that the information is presently still unknown or incomplete.

The ownership information category 304 identifies the entities having ownership rights to the composition, the countries where the ownership applies (because ownership may be different between different countries), and a percent or fraction of ownership if applicable (because in some countries, ownership may be split between more than one entity). In the illustrated example, the ownership information indicates that "Publisher A" owns 66.66% of the composition in the United States and "Publisher B" owns 33.34% of the composition in the United States.

The rights category 306 indicates the ownership policies selected by the content owners ("Owner Policy"), if known, and the policy actually being applied by the hosting service ("Applied Policy"). As explained above, the policies can include, for example, monetize, track, or block. The rights category 306 includes a drop-down box 307 allowing a viewer to select "Match Claim" (as selected in the illustration), or "Embed Claim" (not shown). When "Match Claim" is selected (as illustrated) the ownership policies displayed are those selected and/or applied when a matching composition is detected. In the illustrated example, the owners have selected to "Monetize (and track) if Location of the viewer is the United States" and the hosting service is applying the same policy. If, alternatively, "Embed Claim" is selected from the drop down box 307, the ownership policies are displayed for a sound recording that embed the composition. This would allow, for example, a publisher to block usage even if a label owning the sound recording chooses to track or monetize.

The related assets category 308 identifies other assets (e.g., sound recordings) that embed the composition. In the illustrated example, the related assets category identifies a sound recording ("Composition in A Major") that embodies the composition.

The reference content category 310 identifies reference recordings, if any, provided by the content owners of the composition. Here, none of the publishers have provided a reference recording representative of the composition. However, the composition may still be linked to a reference recording for the purpose of determining composition matches if the location of a reference recording for any of the related assets (e.g., the related sound recording titled "Composition in A Major") is known. The entry illustrated in FIG. 3 is just one example of a metadata entry for a composition. In other embodiments, the entries can have different categories, fields, data, and organizational structures.

FIG. 4 is graphical interface illustrating an example of an ownership metadata entry associated with a reference sound recording. Similar to the composition ownership metadata shown in FIG. 3, the sound recording ownership metadata may be used only internally, and may therefore not be available for display in a graphical interface. The sound recording ownership metadata is divided into a number of categories, each comprising different identifying fields. For example, in this embodiment, the ownership metadata is categorized into metadata 402, ownership information 404, related assets 408, and reference content 410 categories.

The metadata category 402 provides various information identifying the reference sound recording and includes many of the same fields as the composition metadata discussed above. Additionally, the metadata category 402 may include some fields specific to sound recordings such as, for example, Genre, Label, Audio ISRC, UPC, and GRid.

The ownership information category 404 indicates one or more entities having ownership rights to the sound recording. In this case, "Label A" owns the sound recording worldwide. The related assets category 408 identifies other assets (e.g., compositions) that the sound recording embodies. In the illustrated example, the sound recording embodies the composition, "Composition in A Major," discussed above with respect to FIG. 3.

The reference content category 410 identifies one or more reference recordings associated with the sound recording. In the illustrated embodiment, the owner (Label A) has provided two different reference recordings that can be used by the content recognition system 130 to identify the sound recording. Various identifying fields are provided for each reference recording including, for example, Reference ID, Date (i.e., date/time of submission), Type (audio or video), Provider (i.e., the submitting entity), and Status (active or inactive). The entry illustrated in FIG. 4 is just one example of a metadata entry for a sound recording. In other embodiments, the entries can have different categories, fields, data, and organizational structures.

Figure 5:
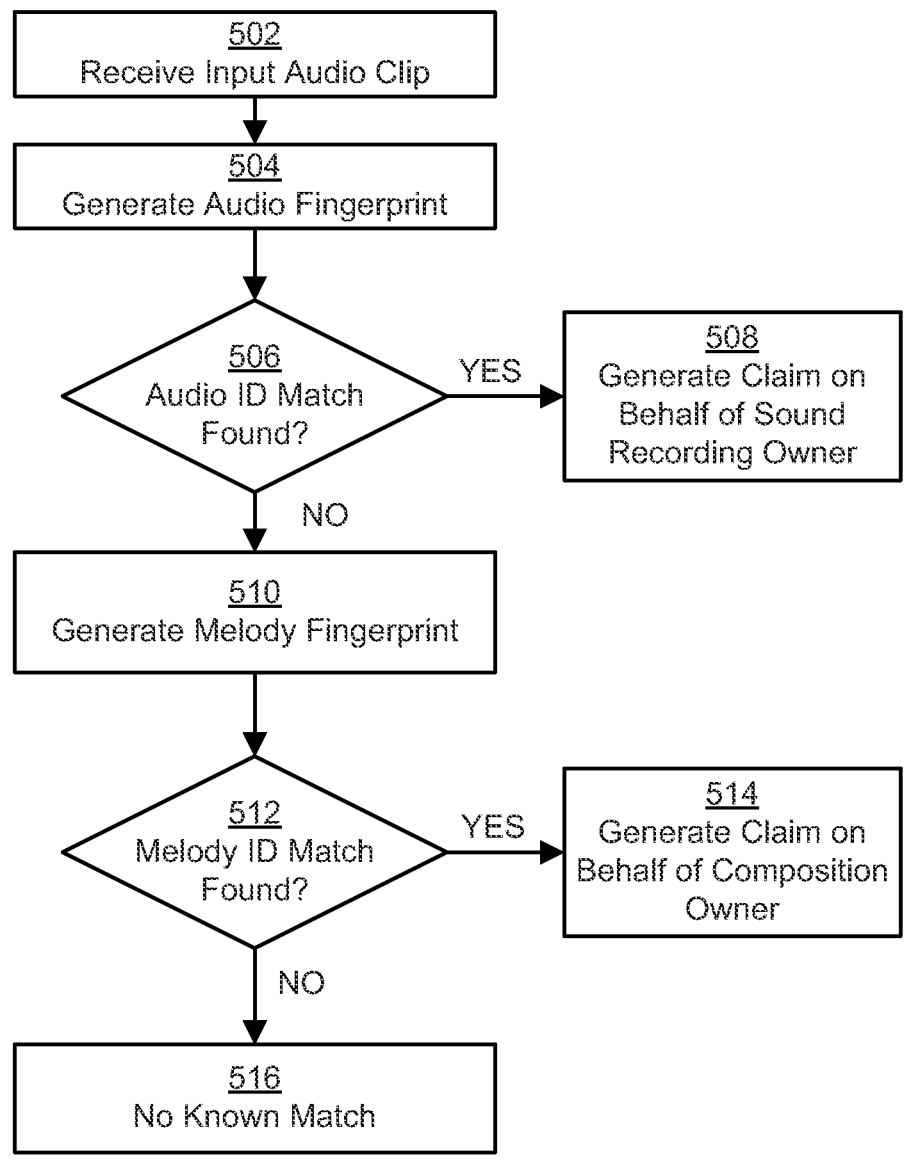
FIG. 5 is a flowchart illustrating an embodiment of a process for identifying ownership information pertaining to media content and generating claims on behalf of the owners.

FIG. 5 is a flowchart illustrating a process performed by the content recognition system 130 for determining ownership information 143 associated with an audio clip 141. The content recognition system 130 receives 502 the audio clip 141 and generates 504 an audio fingerprint (i.e., audio ID file) representing the audio clip 141. The content recognition system 130 then determines 506 if the audio fingerprint for the audio clip 141 matches a reference audio fingerprint in the audio ID database 144. If an audio fingerprint match is found, a claim is generated 508 on behalf of the content owners of the sound recording. For an audio fingerprint match, a claim is typically generated on behalf of both the sound recording owner (typically a record label) and the composition owner (typically a publisher). As explained above, when an audio fingerprint from a clip 141 matches a reference audio fingerprint, the match allows both the ownership of the sound recording and the ownership of the composition that is embodied in the sound recording to be determined.

If no audio fingerprint match is found, the content recognition system 130 generates 510 a melody fingerprint representing the underlying melody in the audio clip 141. The content recognitions system 130 then determines 512 if the melody fingerprint for the input audio clip 141 matches a reference melody fingerprint in the melody ID database 142. If a match is found, a claim is generated 514 on behalf of the content owners of the composition that is embodied in the audio clip 141. However, since no audio ID match was found, no claim can be made on behalf of an owner of the sound recording embodied in the audio clip 141.

If neither an audio ID nor melody ID match is found, then no known match exists 516 for the audio clip 141 in the content recognition system 130 and no claims are generated.

For efficiency, when an audio ID match is found in step 506, it is generally unnecessary to also generate and compare melody fingerprints in steps 510-514. Instead, once a sound recording match is detected, the underlying composition can generally be determined from the sound recording metadata, such as the related assets metadata 408 that identifies the composition that is embodied in the sound recording. In other embodiments, the melody fingerprint can be generated in addition to the audio fingerprint, even if there is match.

In an alternative embodiment, audio and melody fingerprint matching is performed for every input audio clip 141. In this embodiment, the strengths of the best matching audio and melody fingerprints are considered in determining audio fingerprint and/or melody fingerprint matches. For example, the confidence of an otherwise weak (low confidence) audio fingerprint match may be boosted if a strong (high confidence) melody fingerprint match to the same reference sound recording exists. In this way, an audio fingerprint match may be detected even when the match would not have been apparent from comparing the audio fingerprints alone. In general, weights can be applied to the metrics found for the best matching audio and melody fingerprints, and different ways of combining these weighted metrics can be employed to determine whether the best matching audio and/or melody fingerprint is considered a matching audio and/or melody fingerprint.

Figure 6:
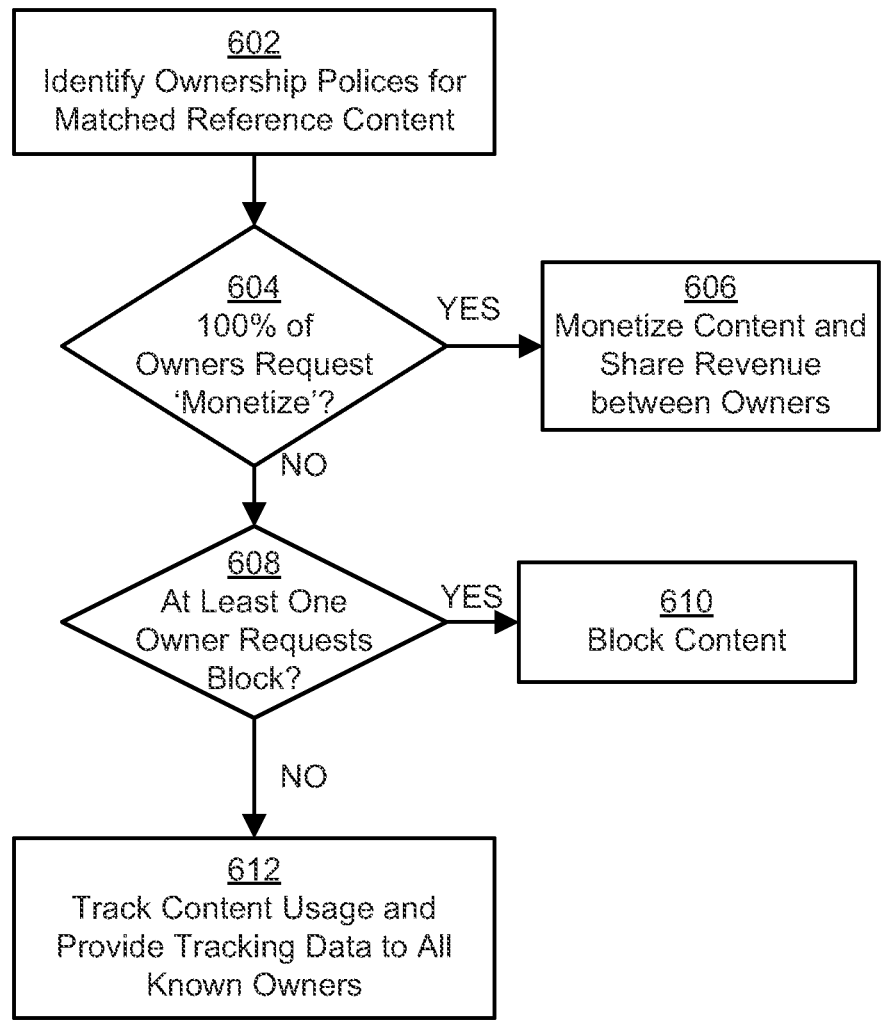
FIG. 6 is a flowchart illustrating an embodiment of a process for implementing an ownership policy associated with hosted media content.

The claims generated on behalf of the content owners invoke the ownership policies associated with the identified media content. FIG. 6 illustrates an example of a method for carrying out ownership policies based on a generated claim (performed, for example, by the rights management engine 116). The rights management engine 116 identifies 602 ownership policies for the media content identified by the content recognition system 130 by accessing the ownership information in the ownership database 146. If the rights management engine 116 determines 604 that 100% of the owners have requested to monetize the content, then the rights management engine 116 takes steps to monetize 606 the content and to proportionately distribute revenues between the content owners. Details of the monetization policy, including revenue distribution, are typically dictated by a licensing agreement between the media hosting service and the one or more content owners. Typically, monetizing content includes streaming targeted advertisements together with the user-requested content, and allocating at least a portion of the revenue generated from the advertisers for distribution to the content owners. If the rights management engine 116 instead determines 604 that less than 100% of the owners requested to monetize the content, the rights management engine 116 next determines 608 if at least one owner requests to block the content. If at least one owner requests to block the content, the content is blocked 610. Blocking may include removing the content from the content database 120, or otherwise preventing a user client 150 from accessing the content. If no owners request blocking the content, but at least one owner fails to request monetizing the content, the rights management engine 116 will track 612 content usage and provide the tracking data to the owners. Tracking typically includes collecting statistics related to user requests for the content and providing these statistics to the content owners.

Figure 7:
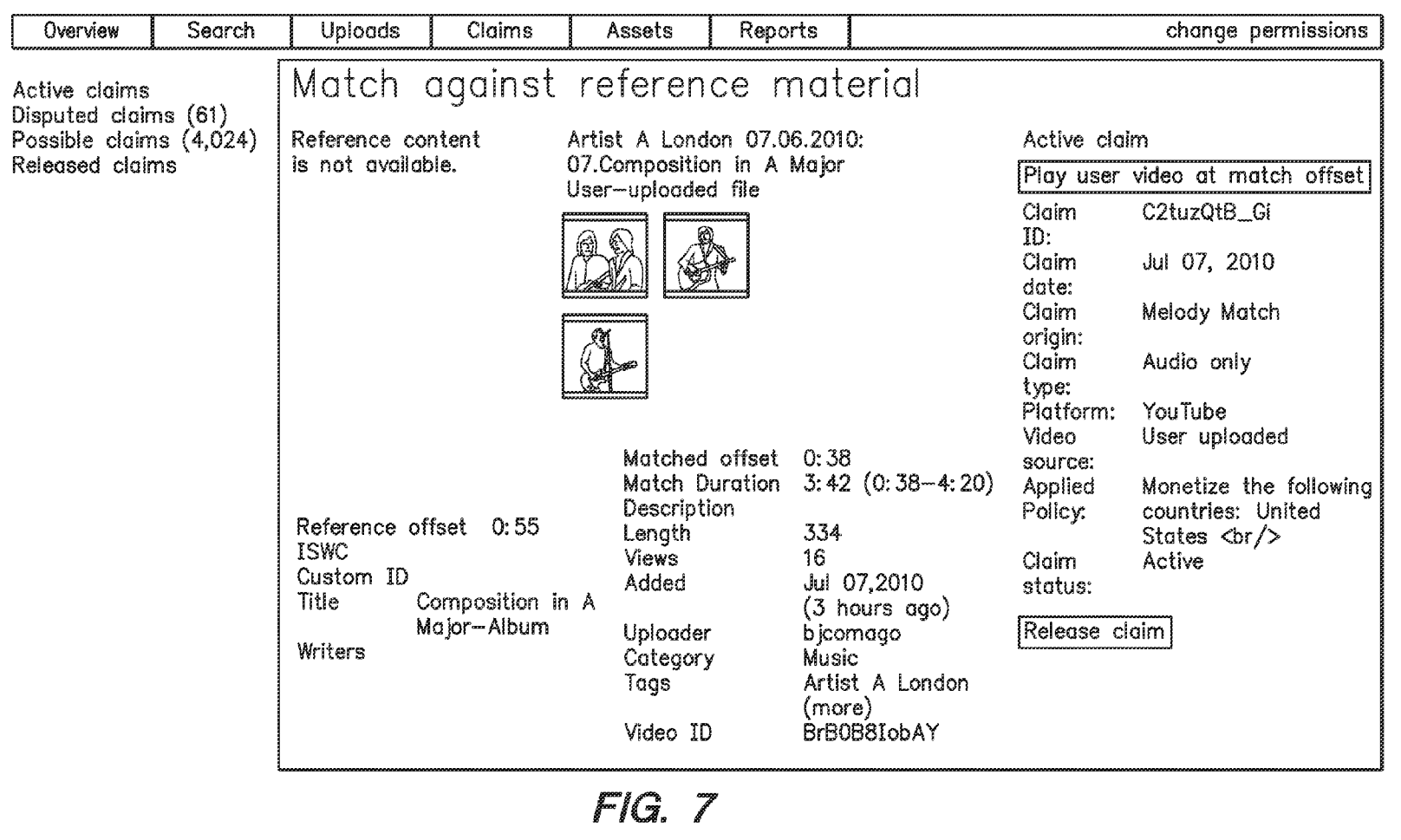

FIG. 7 is a graphical interface illustrating examples of claim metadata generated by the rights management engine 116 in response to identifying uploaded media content. The metadata indicates that the user-uploaded media content comprises footage of a live performance of "Composition in A Major." No sound recording exactly matches the user-provided content (i.e., no audio ID match was found), but the content recognition system nevertheless determined that the melody in the user-provided content matched a melody fingerprint for the known composition "Composition in A Major." The metadata for the generated claim includes various information pertaining to the user-provided content and matched composition, as well as ownership information and associated claim policies. The metadata illustrated in FIG. 7 is just one example of a metadata entry for a generated claim. In other embodiments, different or additional metadata may be included.

Figure 8:
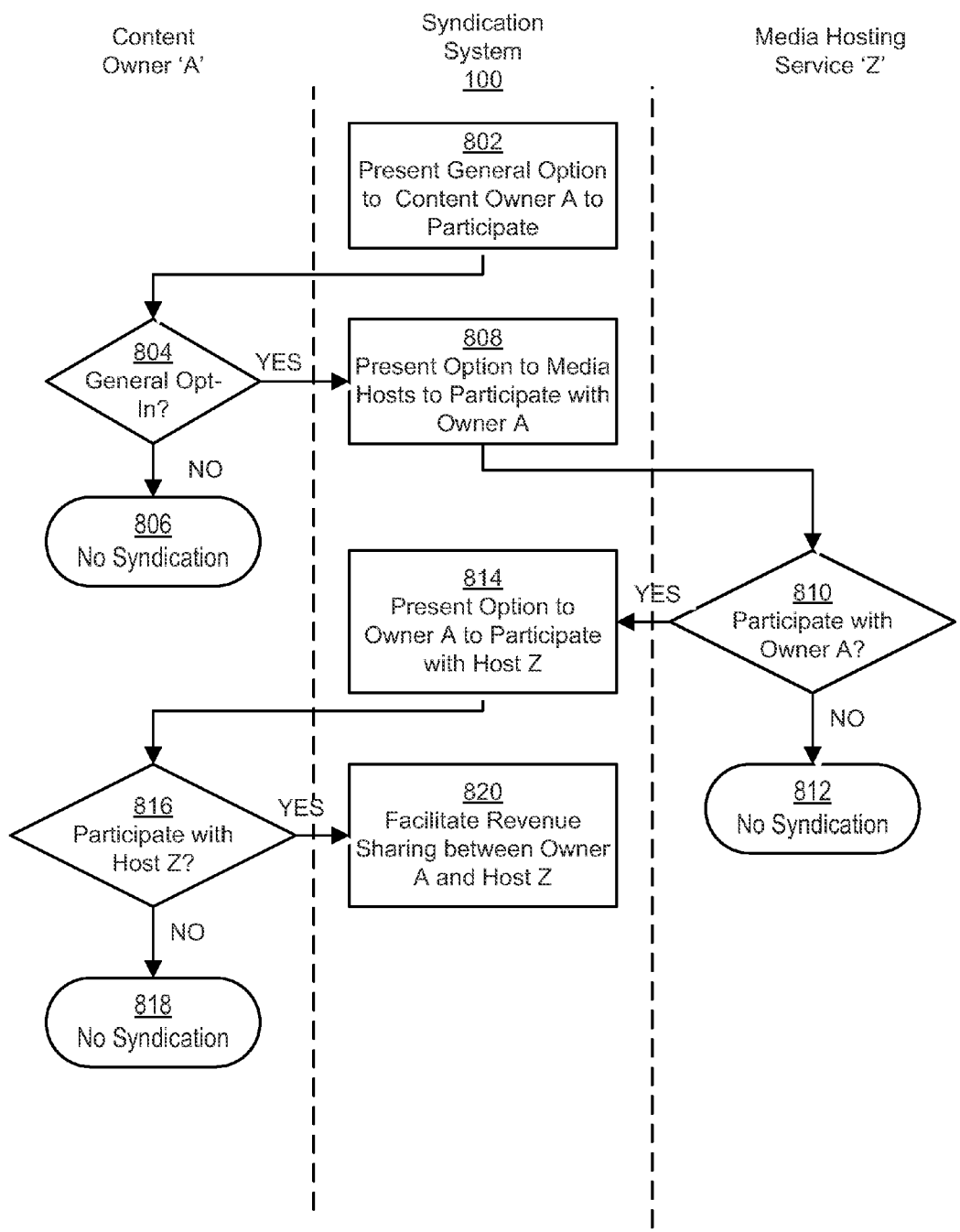
FIG. 8 is a flowchart illustrating an embodiment of a process for determining participation preferences of content owners and media hosting services.

FIG. 8 illustrates an embodiment of a process for facilitating rights management services between media content owners and a media hosting services. The syndication system 100 first presents 802 to content owners (including, for example, a content owner A) a general option to participate in the rights management service. This option may be presented, for example, via an online user interface available to the content owner A. The content owner A decides 804 whether or not to accept the general option to participate in the service, and inputs this decision via the interface. If the owner A declines, no syndication is invoked for the owner A. The owner A does not participate in the rights management service and the process ends 806.

Otherwise, if the content owner A agrees to participate (e.g., via the online interface), the syndication system 100 then presents 808 to a number of media hosting services (including, for example, a media hosting service Z) an option to participate in the rights management service with the content owner A, and to other content owners who have similarly agreed to participate. This option may again be presented, for example, via an online user interface available to the media hosting service Z.

The media hosting service Z decides 810 whether or not to participate with the content owner A. If the media hosting service Z declines to participate with the content owner A, then no rights management service is facilitated between A and Z and the process ends 812.

Otherwise, if the media hosting service Z agrees to participate with content owner A, the syndication system 100 presents 814 to content owner A an option to participate with the media hosting service Z. The content owner A decides 816 whether or not to participate with the media hosting service Z. If the content owner A declines to participate with media hosting service Z, no rights management service is facilitated between content A and media hosting service Z and the process ends 818. Otherwise, the syndication system facilitates 820 the rights management service between A and Z.

The process in FIG. 8 is described above only with respect to a particular content owner A and media hosting service Z, for purposes of explanation; in practice, the process is repeated for any number of content owner/hosting service pairs. As a result of the process, the syndication system 100 determines pairs of content owners and media hosting services that agree to participate with the syndication system 100 and with each other.

FIG. 9 illustrated an example of an online interface 900 presented to a content owner that allows the content owner to manage syndication polices with respect to various media hosting services. The "CID (Content ID) Syndication Partner" column 910 lists a number of media hosting services that have agreed to participate with the content owner. The "URL" column 920 provides Uniform Resource Locator addresses for each syndication partner. The "Opt-in to Syndication" checkbox 930 indicates whether or not the content owner agrees to participate with that particular hosting service (corresponding to decision block 816 in FIG. 8). For each hosting service for which the content owner participates, the online interface allows the content owner to specify a usage policy 940 specific to that hosting service. For example, in the illustrated interface, the content owner can select between "Global Default," "Global Block," and "Unspecified." If "Global Default" is selected, the content owner's default policy (e.g., monetize, block, or track) is applied when content matches are found from that hosting services. If "Global Block" is selected, content matches from that hosting service will be blocked, regardless of the owner's default policy. If "Unspecified" is selected, the applied policy for matches from that hosting service is managed by an external agreement between the content owner and the media hosting service, and the syndication system does not facilitate the revenue sharing.

Thus, the syndication system 100 beneficially acts in conjunction with the media hosting service 110 to identify hosted media content, determine ownership rights, and apply claim policies to enforce the ownership rights for participating content owners. Additionally, the system benefits content owners by providing a platform to monetize their media content. Finally, the system benefits the users of media hosting services because it allows them access to an expansive library of media content that is licensed for viewing.

Unlike conventional systems, the content recognition system 130 beneficially utilizes melody recognition to efficiently identify compositions embodied in hosted media content. Thus, the content recognition system is able to detect, for example, known compositions that are embodied in previously unknown or uncatalogued performances, including cover recordings and live recordings. As a result, the syndication system 100 provides an efficient and scalable solution to the problem of enforcing ownership rights for hosted media content.

The present invention has been described in particular detail with respect to a limited number of embodiments. Those of skill in the art will appreciate that the invention may additionally be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Furthermore, the system may be implemented via a different combination of hardware and software from that described. Also, the particular division of functionality between the various system components described herein is merely exemplary, and not mandatory; functions performed by a single system component may instead be performed by multiple components, and functions performed by multiple components may instead be performed by a single component.

Some portions of the above description present the feature of the present invention in terms of algorithms and symbolic representations of operations on information. These algorithmic descriptions and representations are the means used by those skilled in the art to most effectively convey the substance of their work to others skilled in the art. These operations, while described functionally or logically, are understood to be implemented by computer programs stored in a memory and executed by one or more processors. Furthermore, it has also proven convenient at times, to refer to these arrangements of operations as modules or code devices, without loss of generality.

Unless specifically stated otherwise as apparent from the present discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

The invention claimed is:

1. A computer-implemented method for facilitating a rights management service between a composition owner and a media hosting service, the method comprising:
   receiving from the media hosting service, a representation of an input media file, the input media file including an audio clip;
   processing the audio clip to extract dominant musical tones present in the audio clip, the processing comprising using an audio model that simulates how a human auditory system processes and represents sound to extract representative features of the audio clip that are characteristic of dominant musical tones perceived by a human ear;
   generating, by a processing device, an input melody fingerprint for the audio clip, the input melody fingerprint representing a sequence of pitch intervals between the dominant musical tones present in the processed audio clip;
   determining a matching reference melody fingerprint from a melody fingerprint reference database that matches the input melody fingerprint, the matching reference melody fingerprint representing a melody of a composition that is embodied in the audio clip;
   determining a strength of the match between the matching reference melody fingerprint and the input melody fingerprint;
   generating an input audio fingerprint for the audio clip representing features that uniquely represent a sound recording embodied by the audio clip;
   comparing the input audio fingerprint to a plurality of reference audio fingerprints in an audio fingerprint reference database; and
   identifying a matching reference audio fingerprint that matches the input audio fingerprint responsive to the comparing and the determined strength of the match between the matching reference melody fingerprint and the input melody fingerprint;
   identifying the composition owner as having ownership of the composition based on a reference sound recording associated with the determined matching reference melody fingerprint and with the identified matching reference audio fingerprint; and facilitating an ownership management policy between the media hosting service and the composition owner, the ownership management policy associated with use of the input media file by the media hosting service.

2. The computer-implemented method of claim 1, further comprising:

receiving an agreement over a first online interface from the composition owner to participate in the rights management service;

presenting to the media hosting service via a second online interface, an option to participate with the composition owner in the rights management service;

responsive to receiving from the media hosting service via the second online interface, an affirmative response to participate with the composition owner, presenting to the composition owner via the first online interface, an option to participate with the media hosting service; and responsive to receiving from the composition owner via the first online interface, an affirmative response to participate with the media hosting service storing an indication of an agreement between the composition owner and the media hosting service.

3. The computer-implemented method of claim 1, wherein facilitating an ownership management policy comprises:

determining an ownership policy associated with use of the composition by the media hosting service; and responsive to the ownership policy indicating a block on the composition, causing the media hosting service to block access to the input media file.

4. The computer-implemented method of claim 1, further comprising:

determining an ownership policy associated with use of the composition by the media hosting service; and responsive to the ownership policy indicating monetization of the composition, allocating a portion of revenue associated with use of the input media file by the media hosting service to the composition owner.

5. The computer-implemented method of claim 1, further comprising:

generating an input audio fingerprint for the audio clip representing features that uniquely represent a sound recording embodied by the audio clip;

determining a matching reference audio fingerprint from an audio fingerprint reference database that matches the input audio fingerprint;

identifying a sound recording owner as having ownership of the sound recording based on metadata associated with the matching reference audio fingerprint; and facilitating an ownership management policy between the media hosting service and the sound recording owner, the ownership management policy associated with use of the input media file by the media hosting service.

6. The computer-implemented method of claim 1, wherein determining a matching reference melody fingerprint comprises:

dividing the input melody fingerprint into a plurality of bands determined using locality-sensitive hashing (LSH);

using each band as an index into the melody fingerprint reference database to identify a set of candidate reference fingerprints; and comparing the input melody fingerprint to the candidate reference fingerprints in the set to identify the matching reference melody fingerprint.

7. The computer-implemented method of claim 1, wherein the input melody fingerprint is invariant to parameters used to perform or record a performance of the composition that is embodied in the audio clip.

8. A non-transitory computer-readable storage medium storing instructions for facilitating a rights management service between a composition owner and a media hosting service, the instructions when executed by a processor causing the processor to perform steps comprising:

receiving from the media hosting service, a representation of an input media file, the input media file including an audio clip;

processing the audio clip to extract dominant musical tones present in the audio clip, the processing comprising using an audio model that simulates how a human auditory system processes and represents sound to extract representative features of the audio clip that are characteristic of dominant musical tones perceived by a human ear;

generating an input melody fingerprint for the audio clip, the input melody fingerprint representing a sequence of pitch intervals between the dominant musical tones present in the processed audio clip;

determining a matching reference melody fingerprint from a melody fingerprint reference database that matches the input melody fingerprint, the matching reference melody fingerprint representing a melody of a composition that is embodied in the audio clip;

determining a strength of the match between the matching reference melody fingerprint and the input melody fingerprint;

generating an input audio fingerprint for the audio clip representing features that uniquely represent a sound recording embodied by the audio clip;

comparing the input audio fingerprint to a plurality of reference audio fingerprints in an audio fingerprint reference database; and identifying a matching reference audio fingerprint that matches the input audio fingerprint responsive to the comparing and the determined strength of the match between the matching reference melody fingerprint and the input melody fingerprint;

identifying the composition owner as having ownership of the composition based on a reference sound recording associated with the determined matching reference melody fingerprint and with the identified matching reference audio fingerprint; and facilitating an ownership management policy between the media hosting service and the composition owner, the ownership management policy associated with use of the input media file by the media hosting service.

9. The non-transitory computer-readable storage medium of claim 8, further comprising instructions for:

receiving an agreement over a first online interface from the composition owner to participate in the rights management service;

presenting to the media hosting service via a second online interface, an option to participate with the composition owner in the rights management service;

responsive to receiving from the media hosting service via the second online interface, an affirmative response to participate with the composition owner, presenting to the composition owner via the first online interface, an option to participate with the media hosting service; and responsive to receiving from the composition owner via the first online interface, an affirmative response to participate with the media hosting service storing an indication of an agreement between the composition owner and the media hosting service.

10. The non-transitory computer-readable storage medium of claim 8, wherein facilitating an ownership management policy comprises:
   determining an ownership policy associated with use of the composition by the media hosting service; and
   responsive to the ownership policy indicating a block on the composition, causing the media hosting service to block access to the input media file.

11. The non-transitory computer-readable storage medium of claim 8, wherein facilitating the ownership management policy comprises:
   determining an ownership policy associated with use of the composition by the media hosting service; and
   responsive to the ownership policy indicating monetization of the composition, allocating a portion of revenue associated with use of the input media file by the media hosting service to the composition owner.

12. The non-transitory computer-readable storage medium of claim 8, further comprising instructions for:
   generating an input audio fingerprint for the audio clip representing features that uniquely represent a sound recording embodied by the audio clip;
   determining a matching reference audio fingerprint from an audio fingerprint reference database that matches the input audio fingerprint;
   identifying a sound recording owner as having ownership of the sound recording based on metadata associated with the matching reference audio fingerprint; and
   facilitating an ownership management policy between the media hosting service and the sound recording owner, the ownership management policy associated with use of the input media file by the media hosting service.

13. The non-transitory computer-readable storage medium of claim 12, further comprising instructions for:
   receiving an agreement from the sound recording owner to participate in the rights management service;
   presenting to the media hosting service, an option to participate with the sound recording owner in the rights management service;
   responsive to receiving from the media hosting service, an affirmative response to participate with the sound recording owner, presenting to the sound recording owner, an option to participate with the media hosting service; and
   responsive to receiving from the sound recording owner, an affirmative response to participate with the media hosting service storing an indication of an agreement between the sound recording owner and the media hosting service.

14. The non-transitory computer-readable storage medium of claim 12, wherein facilitating the ownership management policy comprises:
   determining a first ownership policy associated with use of the composition by the media hosting service; and
   determining a second ownership policy associated with use of the sound recording by the media hosting service; and
   responsive to one of the first and second ownership policies indicating a block, causing the media hosting service to block access to the input media file.

15. The non-transitory computer-readable storage medium of claim 12, wherein facilitating the ownership management policy comprises:
   determining a first ownership policy associated with use of the composition by the media hosting service; and
   determining a second ownership policy associated with use of the sound recording by the media hosting service; and
   responsive to both the first and second ownership policies indicating monetization, allocating a first portion of revenue associated with use of the input media file by the media hosting service to the composition owner and allocating a second portion of the revenue to the sound recording owner.

16. A system for facilitating a rights management service between a composition owner and a media hosting service, the system comprising:
   a computer system; and
   a non-transitory computer-readable storage medium storing instructions that when executed by the computer system cause the computer system to perform steps comprising:
   receiving from the media hosting service, a representation of an input media file, the input media file including an audio clip;
   processing the audio clip to extract dominant musical tones present in the audio clip, the processing comprising using an audio model that simulates how a human auditory system processes and represents sound to extract representative features of the audio clip that are characteristic of dominant musical tones perceived by a human ear;
   generating an input melody fingerprint for the audio clip, the input melody fingerprint representing a sequence of pitch intervals between the dominant musical tones present in the processed audio clip;
   determining a matching reference melody fingerprint from a melody fingerprint reference database that matches the input melody fingerprint, the matching reference melody fingerprint representing a melody of a composition that is embodied in the audio clip;
   determining a strength of the match between the matching reference melody fingerprint and the input melody fingerprint;
   generating an input audio fingerprint for the audio clip representing features that uniquely represent a sound recording embodied by the audio clip;
   comparing the input audio fingerprint to a plurality of reference audio fingerprints in an audio fingerprint reference database; and
   identifying a matching reference audio fingerprint that matches the input audio fingerprint responsive to the comparing and the determined strength of the match between the matching reference melody fingerprint and the input melody fingerprint;
   identifying the composition owner as having ownership of the composition based on a reference sound recording associated with the determined matching reference melody fingerprint and with the identified matching reference audio fingerprint; and
   facilitating an ownership management policy between the media hosting service and the composition owner, the ownership management policy associated with use of the input media file by the media hosting service.

17. The system of claim 16, wherein the non-transitory computer-readable storage medium further comprises instructions for:
   receiving an agreement over a first online interface from the composition owner to participate in the rights management service;
   presenting to the media hosting service via a second online interface, an option to participate with the composition owner in the rights management service;

responsive to receiving from the media hosting service via the second online interface, an affirmative response to participate with the composition owner, presenting to the composition owner via the first online interface, an option to participate with the media hosting service; and
responsive to receiving from the composition owner via the first online interface, an affirmative response to participate with the media hosting service storing an indication of an agreement between the composition owner and the media hosting service.

18. The system of claim 16, wherein facilitating the ownership management policy comprises:
   determining an ownership policy associated with use of the composition by the media hosting service; and
   responsive to the ownership policy indicating a block on the composition, causing the media hosting service to block access to the input media file.

19. The system of claim 16, wherein facilitating the ownership management policy comprises:
   determining an ownership policy associated with use of the composition by the media hosting service; and
   responsive to the ownership policy indicating monetization of the composition, allocating a portion of revenue associated with use of the input media file by the media hosting service to the composition owner.

* * * * *